(12) United States Patent
Lee et al.

(10) Patent No.: US 10,429,687 B2
(45) Date of Patent: Oct. 1, 2019

(54) DIRECTIONAL BACKLIGHT UNIT AND THREE-DIMENSIONAL IMAGE DISPLAY APPARATUS HAVING THE SAME

(71) Applicant: SAMSUNG ELECTRONICS CO., LTD., Suwon-si (KR)

(72) Inventors: Sunghoon Lee, Seoul (KR); Joonyong Park, Suwon-si (KR); Bongsu Shin, Seoul (KR); Dongouk Kim, Pyeongtaek-si (KR); Jihyun Bae, Seoul (KR); Dongsik Shim, Hwaseong-si (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/440,535

(22) Filed: Feb. 23, 2017

(65) Prior Publication Data

US 2018/0113250 A1   Apr. 26, 2018

(30) Foreign Application Priority Data

Oct. 25, 2016 (KR) .................. 10-2016-0139292

(51) Int. Cl.
*G02F 1/1335* (2006.01)
*G02B 5/30* (2006.01)
*F21V 8/00* (2006.01)

(52) U.S. Cl.
CPC ..... *G02F 1/133504* (2013.01); *G02B 5/3058* (2013.01); *G02B 6/005* (2013.01);
(Continued)

(58) Field of Classification Search
CPC .... G02B 6/0056; G02B 5/3058; G02B 6/005; G02B 6/0011; G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 6/0088;
(Continued)

(56) References Cited

U.S. PATENT DOCUMENTS 7,579,775 B2   8/2009   Song et al.
7,699,482 B2   4/2010   Noguchi
(Continued)

FOREIGN PATENT DOCUMENTS

JP        5023324 B2    9/2012
KR   10-2010-0046098 A  5/2010
(Continued)

OTHER PUBLICATIONS

Communication dated Sep. 21, 2017, from the European Patent Office in counterpart European Application No. 17150698.3.
(Continued)

*Primary Examiner* — Shan Liu
(74) *Attorney, Agent, or Firm* — Sughrue Mion, PLLC

(57) ABSTRACT

A three-dimensional (3D) image display apparatus includes a directional backlight unit and a display panel. The 3D image display apparatus may include an absorptive wire grid polarizer in the directional backlight unit or the display panel, for minimizing a distance between a diffraction device of the directional backlight unit and a pixel of the display panel.

22 Claims, 11 Drawing Sheets

(52) U.S. Cl.
CPC ..... *G02B 6/0056* (2013.01); *G02F 1/133528* (2013.01); *G02F 2001/133548* (2013.01); *G02F 2001/133626* (2013.01)

(58) Field of Classification Search
CPC ............... G02B 27/2214; G02B 27/22; G02B 27/2278; G02B 27/02; G02B 27/2207; G02B 27/2221; G02B 27/2228; G02B 27/2235; G02B 27/2242; G02B 27/225; G02B 27/2257; G02B 27/2264; G02B 27/26; G02B 27/28; G02B 21/20; G02B 21/22; G02B 23/18; G02B 7/12; G02B 27/24; G02F 1/133528; G02F 2001/133548; G02F 1/133615; G02F 1/1336; G02F 2001/133607; G02F 2001/133616; G02F 1/133606; G02F 1/133504; G03B 23/12; G03B 35/18; G03B 35/20; G03B 35/22; G03B 25/02; G03B 33/14; G03B 35/16; G03B 35/24; G03B 35/26; G03B 21/602; G03B 21/625; H04N 13/00; H04N 21/8146; H04N 21/816; H04N 2213/00; H04N 2213/001; H04N 2213/002; H04N 2013/0461; H04N 2013/0463; H04N 2013/0465; H04N 2213/008; H04N 13/04; H04N 13/0402; H04N 13/0404; H04N 13/0406; H04N 13/0409; H04N 13/0411; H04N 13/0413; H04N 13/0415; H04N 13/0418; H04N 13/042; H04N 13/0422; H04N 13/0429; H04N 13/0431; H04N 13/0434; H04N 13/0436; H04N 13/0438; H04N 13/0443; H04N 13/0459; H04N 13/0497; H04N 13/0055; G01N 2223/414; G06K 2209/40; G06T 15/00; G06T 19/20; G06T 2200/04; G06T 2207/10021; G11B 2020/10611; H01J 31/22; A63F 2250/307; G01S 7/20; G01S 7/52068
USPC ................ 349/65, 61–64, 15; 359/462–477; 348/42, 51–61
See application file for complete search history.

(56) References Cited

U.S. PATENT DOCUMENTS

| | | | |
|---|---|---|---|
| 9,383,589 B2 | 7/2016 | Cho et al. | |
| 2005/0062928 A1 | 3/2005 | Yau et al. | |
| 2006/0227259 A1 | 10/2006 | Mi et al. | |
| 2007/0159577 A1* | 7/2007 | Atsushi | G02B 5/3058 349/96 |
| 2008/0094547 A1* | 4/2008 | Sugita | G02B 5/3058 349/96 |
| 2010/0020566 A1 | 1/2010 | Teng | |
| 2010/0073599 A1 | 3/2010 | Yoon et al. | |
| 2012/0206677 A1 | 8/2012 | Chung et al. | |
| 2014/0043856 A1* | 2/2014 | Thompson | F21V 3/049 362/613 |
| 2014/0176413 A1 | 6/2014 | Jung et al. | |
| 2014/0293187 A1* | 10/2014 | Nam | G02F 1/13362 349/62 |
| 2014/0300840 A1 | 10/2014 | Fattal et al. | |
| 2014/0300947 A1 | 10/2014 | Fattal et al. | |
| 2014/0300960 A1 | 10/2014 | Santori et al. | |
| 2015/0009307 A1 | 1/2015 | Lee et al. | |
| 2015/0029438 A1* | 1/2015 | Chung | G02F 1/133502 349/62 |
| 2015/0036068 A1 | 2/2015 | Fattal et al. | |
| 2015/0062500 A1* | 3/2015 | Park | G02B 5/3058 349/96 |
| 2016/0131810 A1* | 5/2016 | Takada | G02B 5/3041 359/487.06 |
| 2017/0199420 A1* | 7/2017 | Shin | H04N 13/305 |
| 2017/0329149 A1* | 11/2017 | Fattal | G02F 1/1334 |
| 2018/0081190 A1 | 3/2018 | Lee et al. | |
| 2018/0107011 A1* | 4/2018 | Lu | G09G 3/003 |

FOREIGN PATENT DOCUMENTS

| | | | | |
|---|---|---|---|---|
| KR | 10-2010-0084020 A | 7/2010 | | |
| KR | 10-1007198 B1 | 1/2011 | | |
| KR | 10-2013-0017886 A | 2/2013 | | |
| KR | 10-1282138 B1 | 7/2013 | | |
| KR | 10-1392063 B1 | 5/2014 | | |
| KR | 10-2014-0081221 A | 7/2014 | | |
| KR | 10-2018-0032356 A | 3/2018 | | |
| WO | 2005011292 A1 | 2/2005 | | |
| WO | WO-2014081415 A1 * | 5/2014 | ......... | H04N 13/0418 |

OTHER PUBLICATIONS

Partial European Search Report dated Jun. 8, 2017 by the European Patent Office in counterpart European Application No. 17150698.3.

Jason Geng, "Three-dimensional display technologies", Advances in Optics and Photonics, Nov. 22, 2013, pp. 456-535, vol. 5, No. 4, Rockville, Maryland, USA.

David Fattal, et al., "A multi-directional backlight for a wide-angle, glasses-free three-dimensional display", Nature, Mar. 21, 2013, pp. 348-351, vol. 495, No. 7441, Macmillan Publishers, United Kingdom.

Deng-Ke Yang, et al., "Liquid Crystal Display Components" in "Fundamentals of Liquid Crystal Devices, 2nd Edition", Nov. 30, 2014, pp. 514, Wiley.

Shunsukue Kobayashi, et al., "Optical Components of Backlights" in "LCD Backlights", Apr. 30, 2009, pp. 66-67, John Wiley &Sons, Incorporated, Great Britain.

Office Action dated Mar. 8, 2019 issued by the U.S. Patent and Trademark Office in U.S. Appl. No. 15/404,717.

Office Action dated Sep. 21, 2018 issued by the U.S. Patent and Trademark Office in U.S. Appl. No. 15/404,717.

Office Action dated Mar. 28, 2018 issued by the U.S. Patent and Trademark Office in U.S. Appl. No. 15/404,717.

Advisory Action dated May 17, 2019 issued by the U.S. Patent and Trademark Office in U.S. Appl. No. 15/404,717.

* cited by examiner

DIRECTIONAL BACKLIGHT UNIT AND THREE-DIMENSIONAL IMAGE DISPLAY APPARATUS HAVING THE SAME

CROSS-REFERENCE TO RELATED APPLICATION

This application claims priority from Korean Patent Application No. 10-2016 -0139292 , filed on Oct. 25, 2016 in the Korean Intellectual Property Office, the disclosure of which is incorporated herein by reference in its entirety.

BACKGROUND

1. Field

Exemplary embodiments relate to three-dimensional (3D) image display apparatuses that form 3D images by using a diffraction effect.

2. Description of the Related Art

Recently, many three-dimensional (3D) movies have been produced. Accordingly, many studies on techniques related to 3D image display apparatuses have been conducted. A 3D image display apparatus displays a 3D image based on the binocular parallax of the eyes. Currently commercialized 3D image display apparatuses are based on the binocular parallax of the eyes. A 3D image display apparatus provides a 3D effect to a viewer by respectively providing a left eye image and a right eye image that have different viewpoints from each other to the left eye and the right eye of the viewer. The 3D image display apparatus may be classified into a glass-type 3D image display apparatus that requires use of special glasses and a glass-free 3D image display apparatus that does not require the use of glasses.

Glass-free 3D displays may be divided into a multi-view 3D display, a volumetric 3D display, an integral imaging type display, and a holographic type display according to their operating principles. Recently, research studies relating to multi-view 3D displays have been actively conducted. In a multi-view 3D method, a plurality of views are formed in a viewpoint space by transmitting different types of image information in a plurality of directions. Representative examples of the multi-view 3D method include a parallax barrier, a lenticular lens, a projection, and a directional backlight.

Among these examples, although the multi-view 3D method based on the directional backlight is characterized by low cross-talk as compared to the other methods, enhancement of light efficiency and further cross-talk reduction are required.

SUMMARY

Exemplary embodiments provide a 3D image display apparatuses that form 3D images by using a diffraction effect and reduce a cross-talk.

According to an aspect of an exemplary embodiment, a directional backlight unit includes a light source configured to emit light; a light guide plate including an incident surface upon which the light emitted from the light source is incident, an emission surface from which light that has propagated through the incident surface is emitted, and a reflection surface facing the emission surface; an absorptive wire grid polarizer disposed on the emission surface, including an a plurality of metal wires, each of the plurality of metal wires including an absorptive metal material, each of the plurality of metal wires having a length in a first direction, and each of the plurality of metal wires being arranged in a second direction that is perpendicular to the first direction; and a diffraction device configured to diffract the light emitted from the light guide plate toward a plurality of viewing zones.

The absorptive wire grid polarizer may be disposed between the diffraction device and the light guide plate.

Each of the plurality of metal wires may be integrally formed on the emission surface of the light guide plate.

The directional backlight unit may further include: a planarization layer configured to cover areas between the plurality of metal wires and upper portions thereof.

The planarization layer may include a material that has a same refractivity as a refractivity of the light guide plate.

The diffraction device may be interposed between the absorptive wire grid polarizer and the light guide plate.

The absorptive wire grid polarizer may further include a transparent substrate configured to support the plurality of metal wires, and wherein the transparent substrate is adhered onto the diffraction device.

Each of the plurality of metal wires may include at least one from among Cr, Mo, $FeSi_2$, CuO, and $Fe_3O_4$.

According to an aspect of another exemplary embodiment, a three-dimensional (3D) image display apparatus includes the directional backlight unit; and a display panel configured to modulate a light received from the directional backlight unit according to image information.

The display panel may be a liquid crystal panel.

The liquid crystal panel may include a single polarization plate disposed in a display surface of the liquid crystal panel.

According to an aspect of another exemplary embodiment, a 3D image display apparatus includes a directional backlight unit including: a light source configured to light, a light guide plate including an incident surface upon which the light emitted from the light source is incident, an emission surface from which light that has propagated through the incident surface is emitted, and a reflection surface facing the emission surface, and a diffraction device configured to diffract the light emitted from the light guide plate toward a plurality of viewing zones; and a display panel including: an absorptive wire grid polarizer including a plurality of metal wires, each of the plurality of metal wires including an absorptive metal material, each of the plurality of metal wires having a length in a first direction, and each of the plurality of metal wires being arranged in a second direction that is perpendicular to the first direction; a liquid crystal layer in which a polarization of a light that propagates through the absorptive wire grid polarizer is controlled according to image information; and a polarization plate spaced apart from the absorptive wire grid polarizer such that the liquid crystal layer is disposed therebetween and having a polarization axis in the first direction or the second direction.

The display panel may further include: a transparent substrate configured to support the absorptive wire grid polarizer and including a first surface facing the liquid crystal layer and a second surface facing the directional backlight unit.

The absorptive wire grid polarizer may be disposed on the first surface.

Each of the plurality of metal wires may be integrally formed on the first surface of the transparent substrate.

The absorptive wire grid polarizer may further include a planarization layer configured to cover areas between the plurality of metal wires and upper portions thereof.

The absorptive wire grid polarizer may be disposed on the second surface.

Each of the plurality of metal wires may be integrally formed on the second surface of the transparent substrate.

Each of the plurality of metal wires may include at least one from among Cr, Mo, $FeSi_2$, CuO, and $Fe_3O_4$.

The diffraction device may include a plurality of diffraction device components that are arranged in a repeating pattern, wherein each of the plurality of diffraction device components includes a grating device configured to adjust a direction in which a light is emitted toward the display panel, and wherein the grating device includes a plurality of sub grating devices including gratings in which at least one from among an arrangement direction and an arrangement cycle is different.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
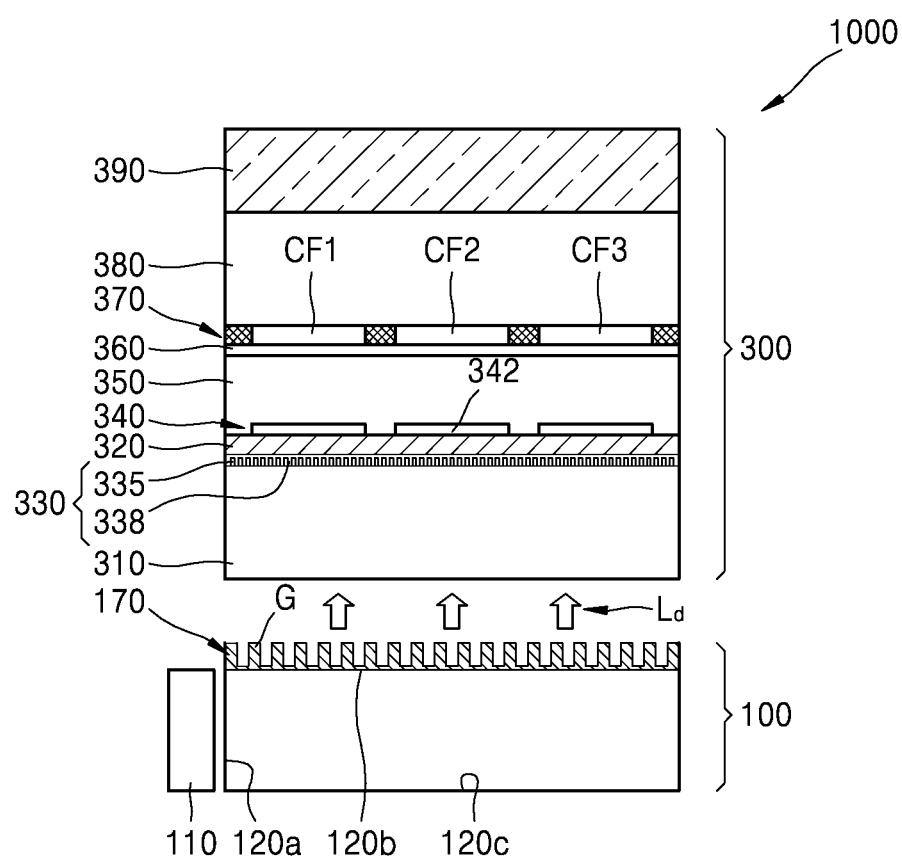
FIG. 1 is a schematic cross-sectional view of a three-dimensional (3D) image display apparatus, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Hereinafter, exemplary embodiments will be described with reference to the accompanying drawings. Throughout the drawings, like reference numerals refer to like elements, and each element may be exaggerated in size for clarity and convenience of a description. Meanwhile, the following exemplary embodiments are merely illustrative, and various modifications may be possible from the exemplary embodiments.

An expression such as "above" or "on" may include not only the meaning of "immediately on in a contact manner", but also the meaning of "on in a non-contact manner" and/or "having intervening items disposed therebetween".

Terms such as first, second, and the like may be used to describe various elements, but the elements should not be limited to those terms. The terms are used to distinguish one element from another element.

As used herein, the singular forms are intended to include the plural forms as well, unless the context clearly indicates otherwise. When a part "includes" an element, it means that the part may further include another element rather than excluding another element, unless indicated otherwise.

The term used in the exemplary embodiments such as "unit" or "module" indicates a unit for processing at least one function or operation, and may be implemented in hardware, software, or in a combination of hardware and software.

Figure 2:
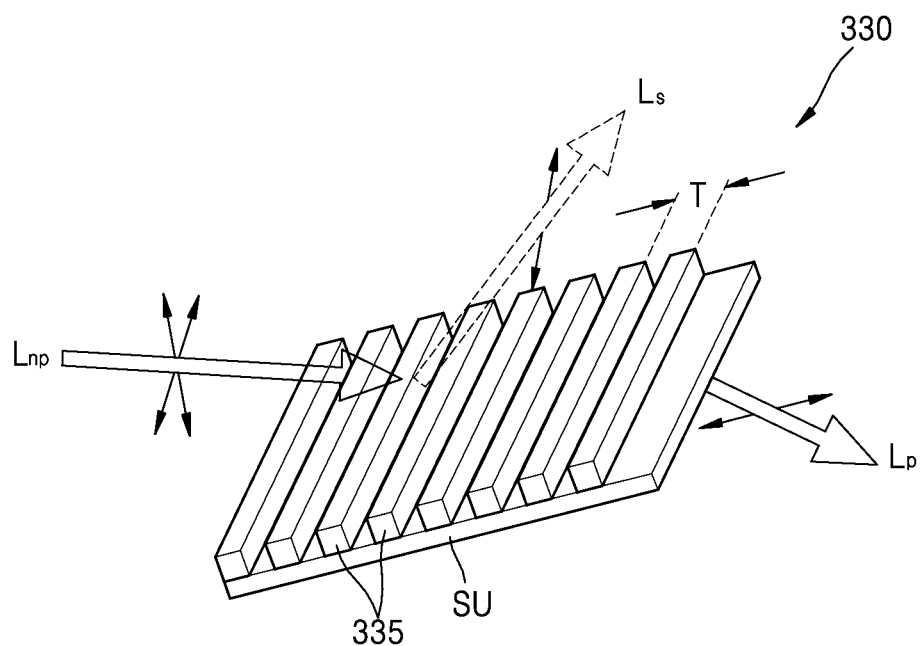
FIG. 2 is a perspective view of an absorptive wire grid polarizer included in the 3D image display apparatus of FIG. 1 for describing a structure and a function thereof, according to an exemplary embodiment.

FIG. 1 is a schematic cross-sectional view of a three-dimensional (3D) image display apparatus 1000, according to an exemplary embodiment. FIG. 2 is a perspective view of an absorptive wire grid polarizer 330 included in the 3D image display apparatus 1000 of FIG. 1 for describing a structure and a function thereof, according to an exemplary embodiment.

The 3D image display apparatus 1000 may include a directional backlight unit 100 that is configured to provide a directional light $L_d$ and a display panel 300 that is configured to modulate light that is received from the directional backlight unit 100 according to image information.

The directional backlight unit 100 may provide the directional light $L_d$ for forming a 3D image to the display panel 300. The directional backlight unit 100 may include a light source 110 configured to emit light, a light guide plate 120 that is configured to guide the light emitted from the light source 110 and to emit the light toward an emission surface, and a diffraction device 170 which is disposed on the light guide plate 120.

The light source 110 may be disposed on at least one side of the light guide plate 120. The light source 110 may emit a light of at least one wavelength band. For example, the light source 110 may include a light-emitting diode (LED) or a laser diode (LD). However, the light source 110 is not limited thereto and may by any light source that emits lights of a plurality of wavelengths. The light source 110 may include a plurality of LEDs or LDs that are disposed on at least one side of the light guide plate 120. The light source 110 may include, for example, a first light source that emits a light of a first wavelength band, a second light source that emits a light of a second wavelength band, and a third light source that emits a light of a third wavelength band. The light source 110 may include a plurality of first light sources, a plurality of second light sources, and a plurality of third light sources. The plurality of first light sources, the plurality of second light sources, and the plurality of third light sources may be disposed to irradiate an incident surface 120a with lights at different respective angles.

The light guide plate 120 may include a transparent member, for example, a glass material or a transparent plastic material, may guide the light emitted from the light source 110 disposed on the side of the light guide plate 120 inside the light guide plate 120 by a total reflection, and may emit the light to an upper emission surface 120b. The light guide plate 120 may include the incident surface 120a upon which light is incident, the emission surface 120b from which the light that has propagated through the incident surface 120a is emitted, and a reflection surface 120c facing the emission surface 120b.

The diffraction device 170 may diffract the light toward a plurality of viewing zones, may include a plurality of gratings G, and may be disposed on the emission surface 120b. The light emitted to the diffraction device 170 may be totally reflected by the reflection surface 120c, may travel inside the light guide plate 120, may be emitted to the diffraction device 170 through the emission surface 120b, and may be diffracted toward the plurality of viewing zones. The plurality of gratings G are schematically illustrated as being the same for convenience of illustration. However, according to an exemplary embodiment, the diffraction device 170 may include a plurality of grating units that includes the gratings G with different respective shapes and different respective arrangement cycles. A detailed configuration of the diffraction device 170 that allows the light to proceed directionally toward the plurality of viewing zones will be described with reference to FIGS. 3, 4, 5, and 6.

The display panel 300 may be, for example, a liquid crystal panel. The display panel 300 may include a first substrate 310 in which a pixel electrode array 340 is formed, a second substrate 380 in which a common electrode 360 is formed, and a liquid crystal layer 350 interposed between the first substrate 310 and the second substrate 380. The absorptive wire grid polarizer 330 may be disposed on the first substrate 310. A polarizer 390 with a polarizing axis that has a direction which is parallel to or perpendicular to the absorptive wire grid polarizer 330 may be disposed on the second substrate 380.

Referring to FIG. 2, the absorptive wire grid polarizer 330 may include a plurality of metal wires 335, each of which includes an absorptive metal material. The plurality of metal wires 335 may be formed on a transparent substrate SU. As shown in FIG. 1, each of the plurality of metal wires 335 may be integrally disposed on the first substrate 310 while the transparent substrate SU may be omitted. The plurality of metal wires 335 may have a length direction of a first direction and may be arranged in a repeating pattern with a predetermined space between adjacent metal wires in a second direction which is perpendicular to the first direction. Each of the metal wires 335 may include an absorptive metal material. The absorptive metal material may include, for example, any of Cr, Mo, $FeSi_2$, CuO, or $Fe_3O_4$.

The absorptive wire grid polarizer 330 may facilitate a propagation of a light of a first polarization, for example, a light $L_p$ of a P polarization, in a perpendicular direction with respect to the length direction of the metal wires 335, and may absorb a light of a second polarization, for example, a light $L_s$ of an S polarization, in a perpendicular direction with respect to the light of the first polarization.

A length of a layout cycle T of the metal wires 335 may be less than a wavelength of a visible ray band. For example, the length of the layout cycle T may be less than several hundred nanometers or may be about several tens of nanometers. A thickness of the metal wires 335 may be greater than a skin depth determined according to a material of the metal wires 335 and a wavelength of an incident light. For example, the thickness may range from several tens of nanometers to several hundred nanometers. The thickness, width, and layout cycle T of the plurality of metal wires 335 may be determined as detailed values in order to increase polarization separation efficiency as described above.

A detailed configuration of the display panel 1000 is described with reference to FIG. 1.

The absorptive wire grid polarizer 330 may further include a planarization layer 338 that covers areas between the plurality of metal wires 335 and upper portions thereof. A thin film transistor (TFT) array layer 320 that includes a plurality of transistors (not shown) may be disposed on the absorptive wire grid polarizer 330.

The pixel electrode array 340 may include a plurality of pixel electrodes 342 respectively facing filters CF1, CF2, and CF3 of a color filter array 370. The plurality of pixel electrodes 342 may be respectively controlled by the plurality of transistors included in the TFT array layer 320.

The color filter array 370 for forming a color may be disposed on the second substrate 380, for example, between the common electrode 360 and the second substrate 380. The color filter array 370 may include a first color filter CF1, a second color filter CF2, and a third color filter CF3. The first color filter CF1, the second color filter CF2, and the third color filter CF3 may be filters that respectively facilitate a propagation of red, green, and blue lights.

The polarization plate 390 may be formed on an outer surface of the second substrate 380 and may facilitate a propagation of a light of a predetermined polarization among lights that propagate through the liquid crystal layer 350 and the color filter array layer 370. A direction of polarization for which the polarization plate 390 is configured to facilitate propagation may be perpendicular to or the same as a polarization direction of the light that propagates through the absorptive wire grid polarizer 330. The polarization plate 390 may be an absorptive polarizer that facilitates propagation of a light of one polarization and absorbs a light of another polarization. The polarization plate 390 may include, for example, a polyvinyl alcohol (PVA) material.

According to an arrangement of the color filters CF1, CF2, and CF3 constituting the color filter array 370 and the pixel electrodes 342 constituting the pixel electrode array 340, basic pixels by which a region of the liquid crystal layer 350 is divided and driven may be determined. Each basic pixel may correspond to a grating unit of a smallest unit of the diffraction device 170 included in the directional backlight unit 100.

A configuration of the diffraction device 170 will be described below with reference to FIGS. 3, 4, 5, and 6.

Figure 3:
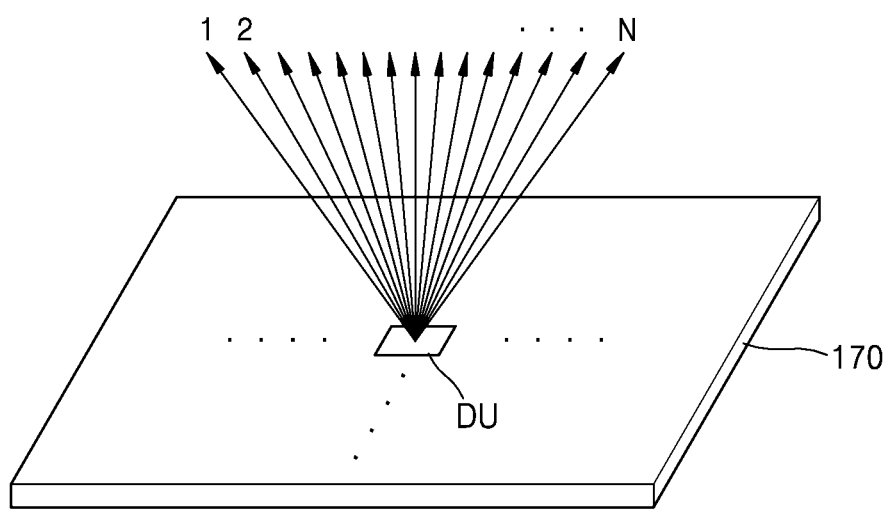
FIG. 3 is a conceptual diagram for describing that a 3D image is recognized by a diffraction device included in a 3D image display apparatus illustrated in FIG. 1, according to an exemplary embodiment.
Figure 4:
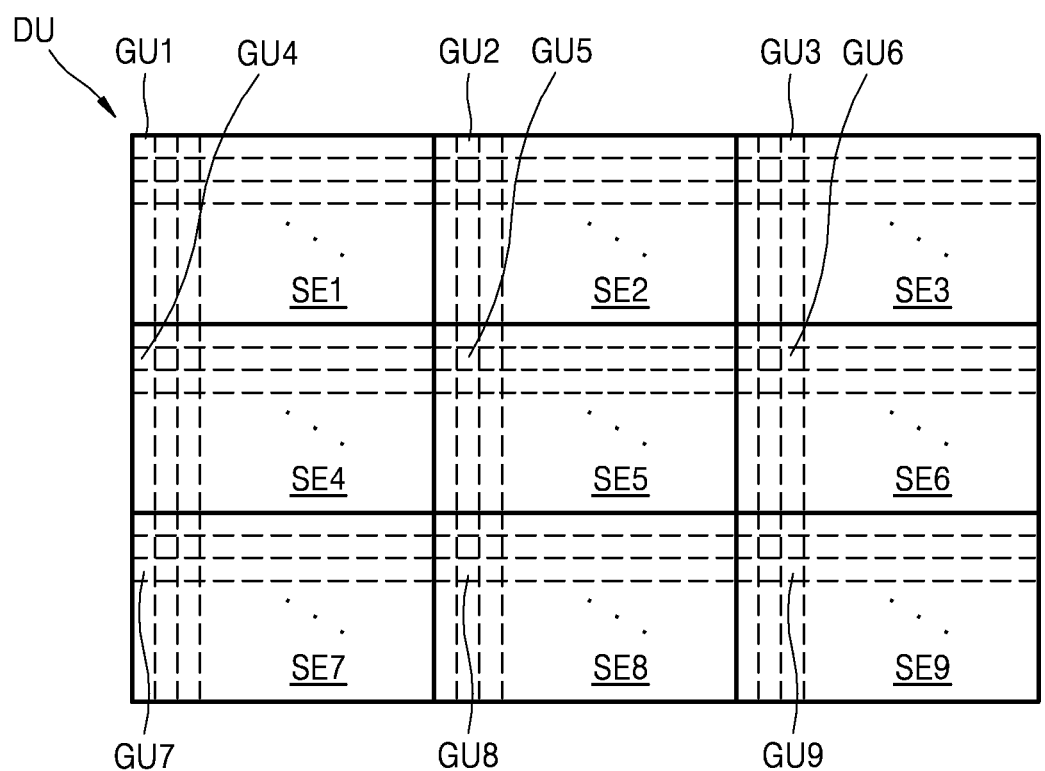
FIG. 4 is a conceptual diagram illustrating that a diffraction device unit of a diffraction device included in a 3D image display apparatus illustrated in FIG. 1 includes grating units corresponding to different viewing zones, according to an exemplary embodiment.
Figure 5:
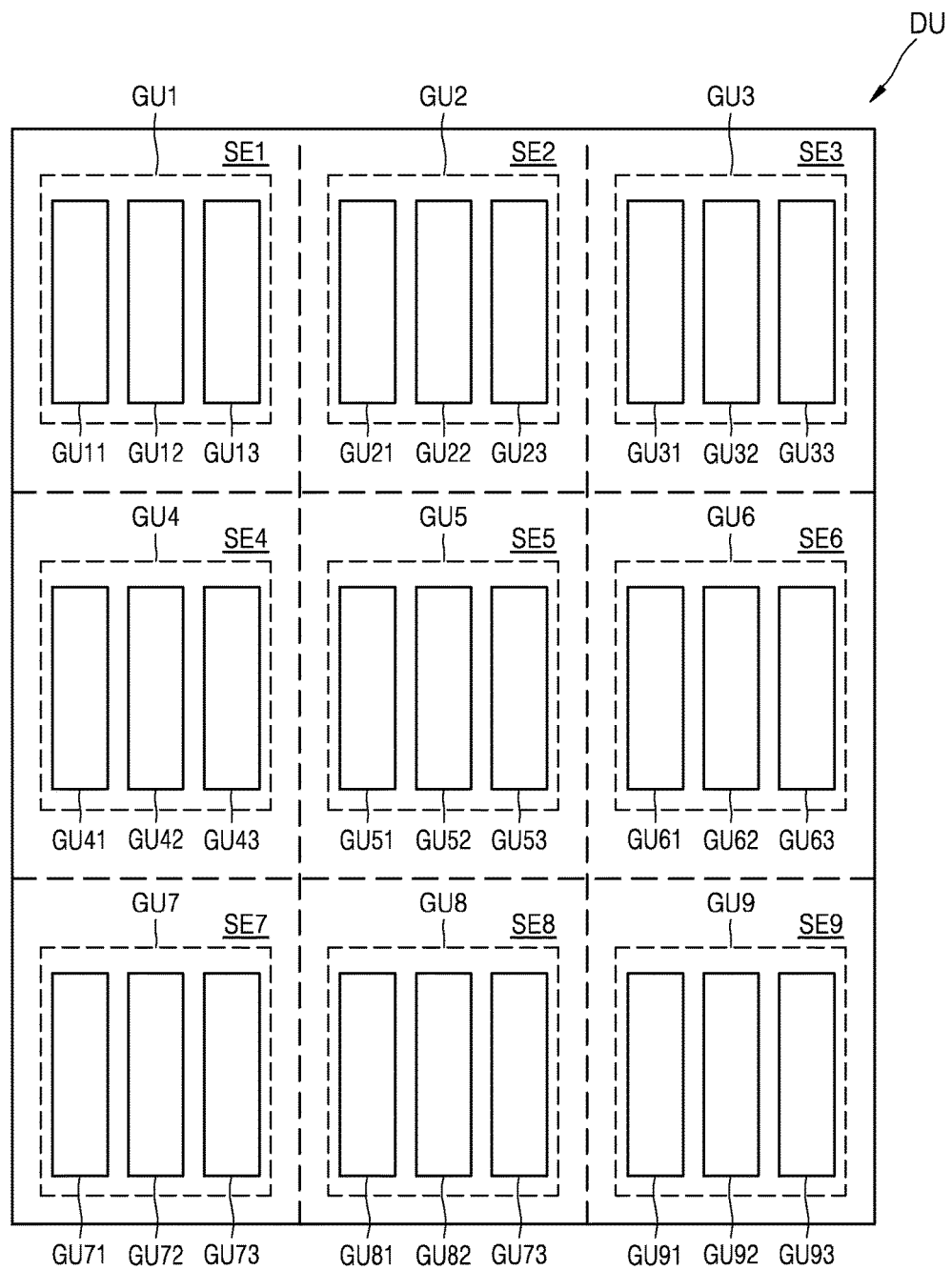
FIG. 5 is a schematic plan view of the grating units of FIG. 4 including a plurality of sub grating units, according to an exemplary embodiment.

FIG. 3 is a conceptual diagram of describing that a 3D image is recognized by a diffraction device included in a 3D image display apparatus illustrated in FIG. 1. FIG. 4 is a conceptual diagram of describing that a diffraction device unit DU of a diffraction device included in a 3D image display apparatus illustrated in FIG. 1 includes grating units corresponding to different viewing zones. FIG. 5 is a schematic plan view of the grating units of FIG. 4 including a plurality of sub grating units.

Referring to FIG. 3, the diffraction device 170 may include a plurality of diffraction device units DU that are arranged in a repeating pattern. The diffraction device units DU may include grating patterns for diffraction of a light toward a plurality of viewing zones. In this aspect, the diffraction device units DU may include the same number of types of grating pattern sets as the number of the plurality of viewing zones. As shown in FIG. 1, a light from the light source 110 may be guided by the light guide plate 120, may be irradiated to the diffraction device units DU formed in the diffraction device 170, and may have directivity toward different viewing zones that correspond to grating patterns formed on an irradiated location. As shown in FIG. 3, the light may be emitted in a direction toward N viewing zones and may be irradiated to the display panel 300. Although directivity of the one diffraction device unit DU is illustrated in FIG. 3, the plurality of diffraction device units DU may be arranged in a repeating pattern. The light irradiated to the diffraction device 170 may proceed directionally toward the N different viewing zones based on the grating pattern formed on each location and may be irradiated to each pixel region of the display panel 300.

As described above, the light emitted in different directions may provide different views in the plurality of viewing zones to display a 3D image. In this regard, a view may represent, for example, an image displayed on one eye from among the two eyes of a viewer but is not limited thereto. The view may provide images corresponding to two or more views to one of eyes of the viewer. The number of grating pattern sets may be determined according to the number of views that are to be formed. A plurality of views may include, for example, 36 views, 48 views, 96 views, etc. As described above, different views may be provided in a plurality of viewing zones, and thus the viewer may recognize the 3D image. As the number of views increases, a space region for recognizing a 3D image may increase and a resolution of each view may be relatively reduced.

Referring to FIGS. 4 and 5, the diffraction device unit DU may include the same number of types of grating pattern sets as the number of the plurality of viewing zones in order to diffract a light toward a plurality of viewing zones. The diffraction device unit DU may include a plurality of sections SE. The number of the plurality of sections SE may be the same as the number N of viewing zones of FIG. 3. The number of the sections SE is 9 in FIGS. 4 and 5, but this is an example and is the exemplary embodiments are not limited thereto.

Each of the plurality of sections SE may include a grating unit configured to adjust an emission direction of light. The plurality of sections SE may include different grating pattern sets. In this regard, the sections SE may present physically identified regions. Alternatively, the sections SE may be regions identified according to the grating pattern sets.

The diffraction device 170 may include, for example, first through ninth sections SE1, SE2, SE3, SE4, SE5, SE6, SE7, SE8, and SE9. In this regard, the sections SE may present regions in which the grating pattern sets are variably configured. For example, the diffraction device 170 may include 9 sections, 16 sections, or 25 sections. In addition, the diffraction device 170 may include various numbers of sections according to the number of views that are to be formed. The grating pattern sets may include a plurality of grating units that may be variably configured according to the sections SE. The first through ninth sections SE1 through SE9 may respectively include the first through ninth grating units GU1 through GU9 that are designed in accordance with directivities of the sections SE.

FIG. 5 is a schematic plan view of the first through ninth grating units GU1 though GU9 of FIG. 4, respectively including a plurality of sub grating units GU11 through GU93.

The first grating unit GU1 may include a 1-1$^{st}$ sub grating unit GU11, a 1-2nd sub grating unit GU12, and a 1-3rd sub grating unit GU13. The second grating unit GU2 may include a 2-1$^{st}$ sub grating unit GU21, a 2-2nd sub grating unit GU22, and a 2-3rd sub grating unit GU23. The ninth grating unit GU9 may include a 9-1$^{st}$ sub grating unit GU91, a 9-2nd sub grating unit GU92, and a 9-3rd sub grating unit GU93. As described above, an ith grating unit GUi may include an i-1$^{st}$ sub grating unit GUi1, an i-2nd sub grating unit GUi2, and an i-3rd sub grating unit GUi3.

An i-j sub grating unit GUij (i=1, . . . , 9, j=1, 2, 3) may present a minimum unit constituting a grating pattern set, and may face one of the first, second, and third color filters CF1, CF2, and CF3 of the color filter array layer 370.

A sub grating unit may include a grating pattern that varies based on a wavelength band of a light. The i-1$^{st}$ sub grating unit GUi1 may include, for example, a grating pattern that diffracts a light of a first wavelength (for example, a light of a red wavelength band). The 1-2nd sub grating unit GUi2 may include, for example, a grating pattern that diffracts a light of a second wavelength (for example, a light of a blue wavelength band). The i-3rd sub grating unit GUi3 may include, for example, a grating pattern that diffracts a light of a third wavelength (for example, a light of a green wavelength band). However, the sub grating unit is not limited thereto, and may include a grating pattern that corresponds to a light of various wavelength bands.

The sub grating units GU11 through GU 93 included in the first through ninth grating units GU1 through GU9 are illustrated to have the same area, but this is an example and is not limited thereto. The sub grating units GU11 through GU 93 may have different areas and different area ratios in the first through ninth grating units GU1 through GU9. All grating units may not have different area ratios, and some grating units may have the same area ratio of sub grating units. This may be determined in consideration of an emission amount of a light emitted from the light guide plate 120 or a light uniformity for each location.

Figure 6:
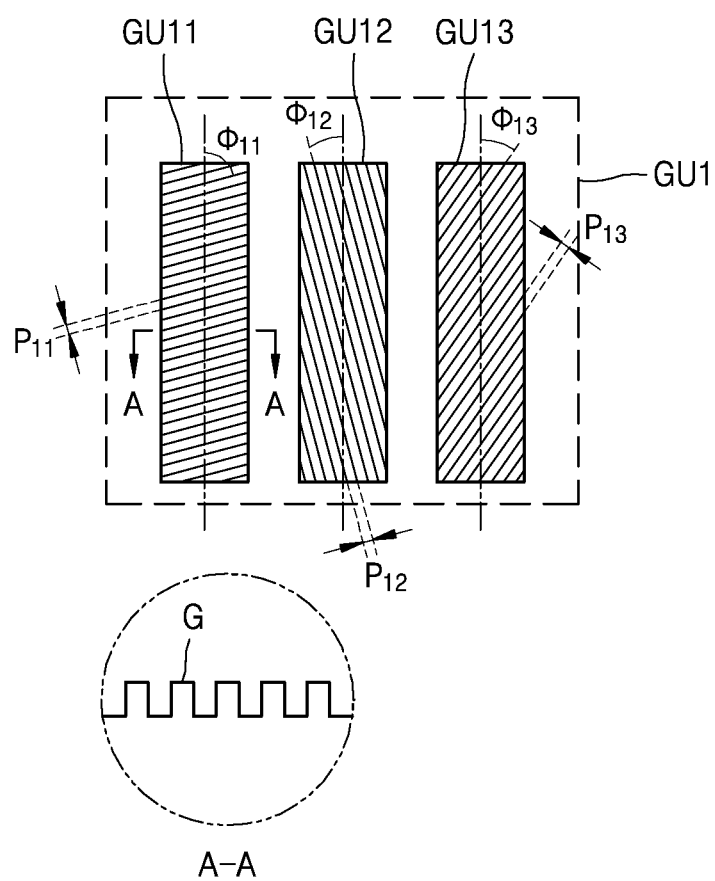
FIG. 6 is a plan view of a detailed configuration of the sub grating units of FIG. 5, according to an exemplary embodiment.

Referring to FIG. 6, the sub grating units GU11, GU12, and GU13 may include the gratings G with different arrangement cycles and different arrangement directions. The grating G of the sub grating unit GU11 may have a pitch $P_{11}$ and an angle $\varphi_{11}$ formed by a first arrangement direction and a first predetermined reference line. The grating G of the sub grating unit GU12 may have a pitch $P_{12}$ and an angle $\varphi_{12}$ formed by a second arrangement direction and a second predetermined reference line. The grating G of the sub grating unit GU13 may have a pitch $P_{13}$ and an angle $\varphi_{13}$ formed by a third arrangement direction and a third predetermined reference line.

The sub grating units GU11, GU12, and GU13 have different arrangement cycles and different arrangement directions in FIG. 6, but this is an example and is not limited thereto. At least one of the arrangement cycle and arrangement direction of the grating G included in each of the sub grating units GU11, GU12, and GU13 may be different.

The diffraction device 170 may produce an interaction between the grating G and a light of a specific wavelength, and may emit a light with a specific direction according to a combination of a pitch of the grating G, an arrangement direction thereof, a refractivity thereof, a duty cycle thereof, a relative angle of a travel direction of the light and the grating G, etc.

The grating G of the 27 sub grating units GUij (i=1, . . . , 9, j=1, 2, 3) included in 9 sections SE1 through SE9 may have a pitch $P_{ij}$ and an arrangement direction $\varphi_{ij}$.

The pitch $P_{ij}$ and the arrangement direction $\varphi_{ij}$ may be determined to implement different respective directivities with respect to lights of different wavelengths. For example, the sub grating units GU11, GU12, and GU13 may have the same viewing zone while relating to lights of different wavelengths, and thus one of a pitch and an arrangement direction sub grating units GU11, GU12, and GU13 may be different.

Figure 7:
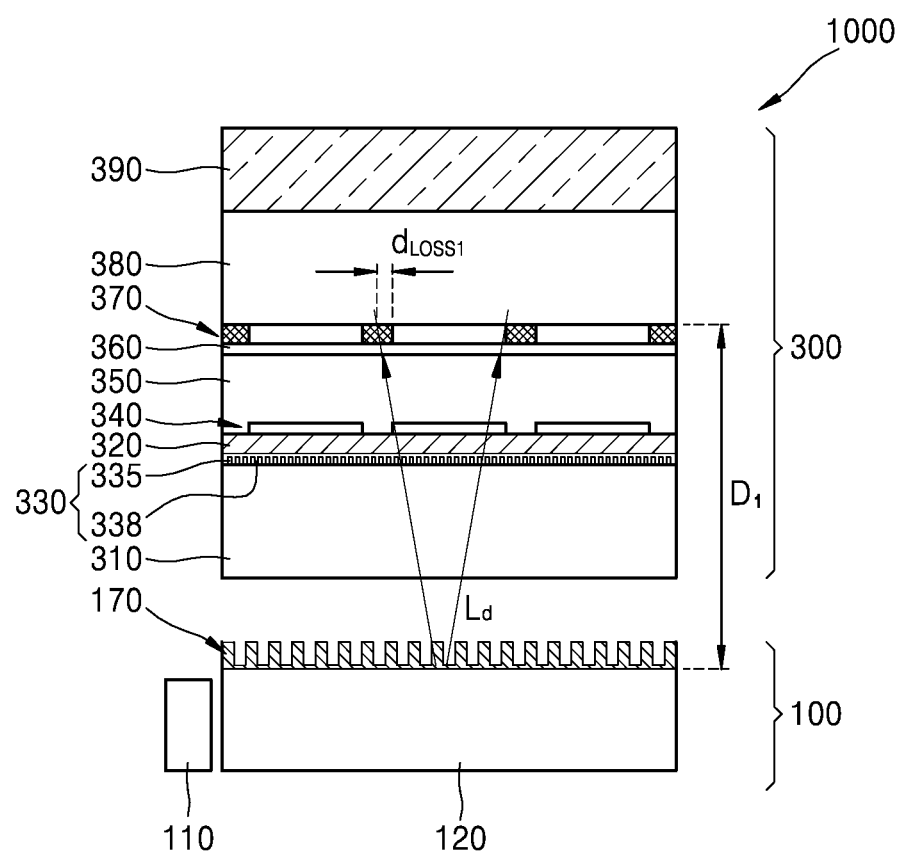
FIG. 7 is a conceptual diagram for describing that the 3D image display apparatus of FIG. 1 shows a low cross-talk since a distance between a diffraction device and a pixel is minimized, according to an exemplary embodiment.

FIG. 7 is a conceptual diagram for describing that the 3D image display apparatus 1000 of FIG. 1 shows a low cross-talk since a distance between the diffraction device 170 and a pixel is minimized.

As described above, the 3D image display apparatus 1000 according to an exemplary embodiment may include the absorptive wire grid polarizer 330 in the display panel 300. A thickness of the absorptive wire grid polarizer 330 may range from several tens of nanometers to several hundred nanometers, which is very small as compared to a thickness from about 150 um to about 200 um of a polarization plate that includes a PVA material that is usually used in a conventional liquid crystal panel. Thus, a distance D1 between the diffraction device 170 and the color filter array 370 may be minimized.

When the directional light $L_d$ formed by the diffraction device 170 arrives at the display panel 300 beyond a determined pixel location, a cross-talk occurs. As described above, a grating unit of a smallest unit formed in the diffraction device 170 may have a correspondence relationship with a pixel. An irradiated light may be modulated in a region of the liquid crystal layer 350 that corresponds to the pixel so as to correspond to its incident directivity. However, when the directional light $L_d$ formed by the diffraction device 170 arrives at the pixel, the directional light $L_d$ may have a particular spread width due to a thickness of the display panel 300, and may go beyond a determined pixel width. An amount of the cross-talk that occurred may be determined according to how much the directional light $L_d$ goes beyond the determined pixel width. The amount of the cross-talk may be expressed, for example, as a length $d_{Loss1}$ that the directional light $L_d$ goes beyond the determined pixel width. As shown in FIG. 7, the length $d_{Loss1}$ may increase as the distance D1 between the diffraction device 170 and the pixel increases. In the 3D image display apparatus 1000 according to an exemplary embodiment, the polarizer 390 that includes the PVA material with a relatively large thickness may be disposed only in an upper portion of the display panel 300, and the absorptive wire grid polarizer 330 may be disposed in a lower portion of the display panel 300. Thus, the distance D1 may be reduced as a thickness difference between a conventional apparatus that includes the PVA material and the absorptive wire grid polarizer 330, and the length $d_{Loss1}$ indicating the cross-talk may be effectively reduced.

Figure 8:
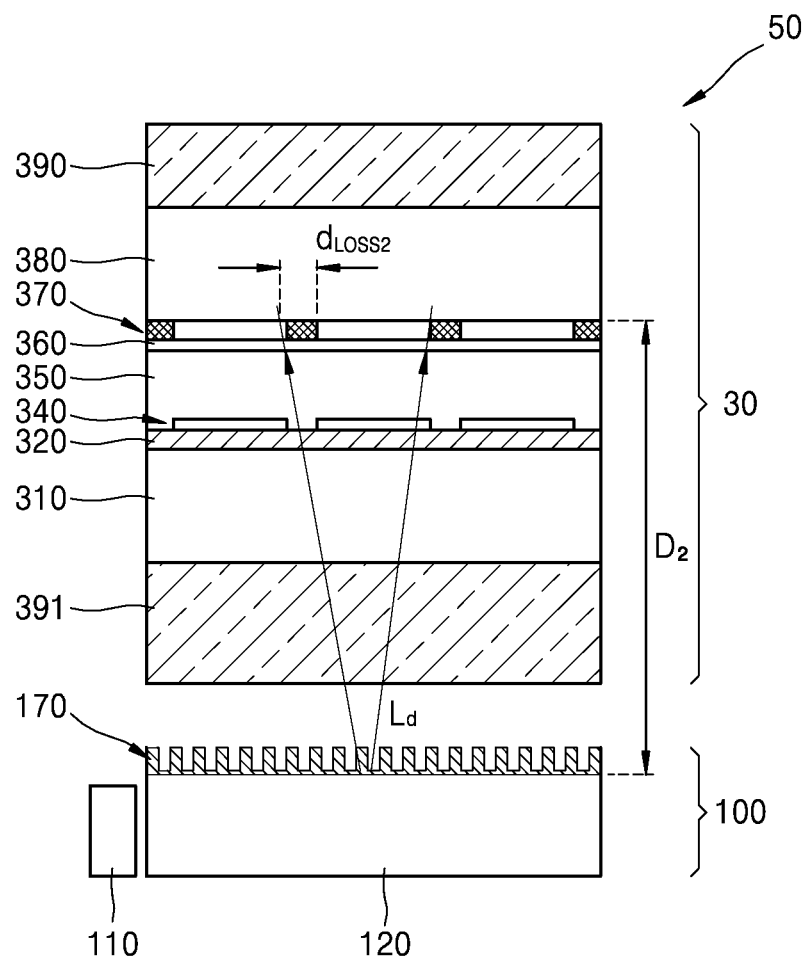
FIG. 8 is a cross-sectional view of a schematic structure of a 3D image display apparatus, according to a comparison example.

FIG. 8 is a cross-sectional view of a schematic structure of a 3D image display apparatus 50, according to a comparison example.

The 3D image display apparatus 50 according to the comparison example may include the directional backlight unit 100 and a display panel 30. Unlike the display panel 300 included in the 3D image display apparatus 1000 according to an exemplary embodiment, the display panel 30 may include polarization plates 390 and 391 which respectively include a PVA material in upper and lower portions of the liquid crystal layer 350. A thickness of the polarization plate 391 may range from about 150 microns to about 200 microns, and thus a distance D2 from the diffraction device 170 and a pixel increases as much as compared to the distance D1 of FIG. 7. As the distance D2 increases, a width $d_{Loss2}$ causing a cross-talk may be greater than the width $d_{Loss1}$.

An effect of reducing the distance D2 from the diffraction device 170 to the pixel may greatly increase as a size of the pixel is reduced. Even though a width that a light from the diffraction device 170 goes beyond a determined pixel is the same, a greater value results from a smaller size of the pixel, in terms of a relative rate with respect to the pixel.

The 3D image display apparatus 1000 according to an exemplary embodiment and the 3D image display apparatus 50 according to the comparison example are compared in view of light efficiency that arrives at the determined pixel according to a resolution of a panel in a table shown below.

| Resolution of panel | UHD | HD |
| --- | --- | --- |
| Comparison example | 19.48% | 68.13% |
| Embodiment | 32.89% | 77.85% |
| Improvement rate | 68.84% | 14.27% |

The light efficiency above presents a rate of a light that propagates toward a predetermined pixel from the diffraction device 170 of the directional backlight unit 100 to the determined pixel, i.e., efficiency of the light that propagates through a color filter of the pixel.

In accordance with the table above, the higher the resolution, i.e., when a pixel size is small, the lower the light efficiency. In an exemplary embodiment, the light efficiency is higher than that in the comparison example with respect to both resolutions.

An improvement rate may present an increase degree of the light efficiency with respect to the light efficiency of the comparison example and indicate that the higher the resolution, the greater the improvement effect.

Figure 9:
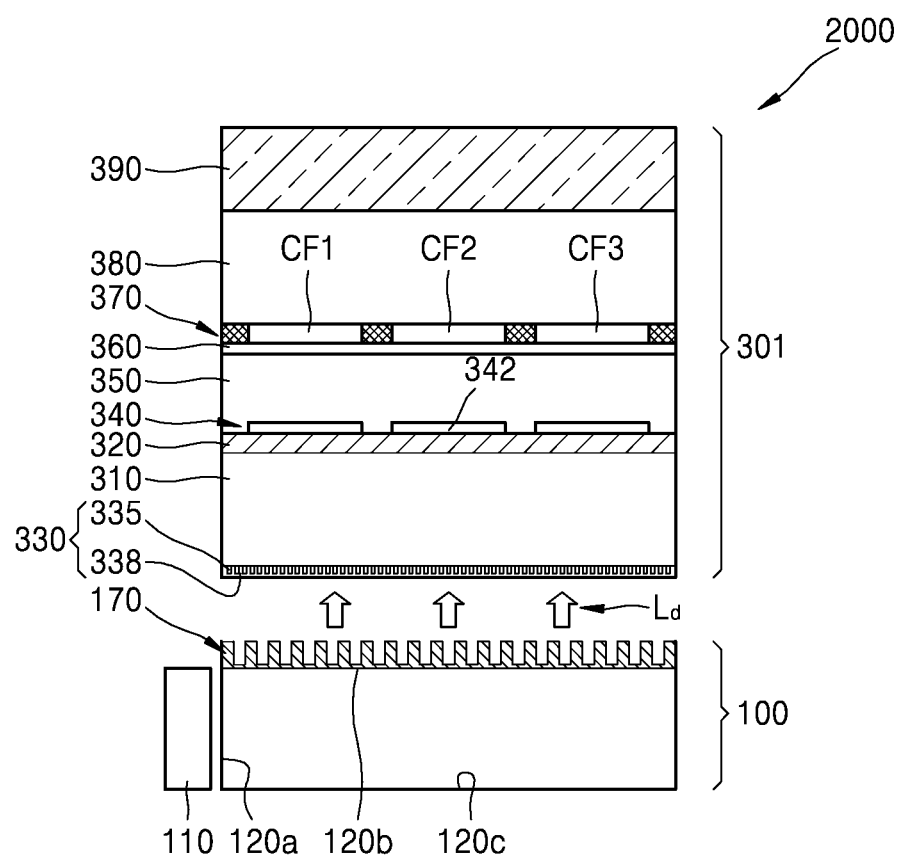
FIG. 9 is a cross-sectional view of a schematic structure of a 3D image display apparatus, according to another exemplary embodiment.

FIG. 9 is a cross-sectional view of a schematic structure of a 3D image display apparatus 2000, according to another exemplary embodiment.

The 3D image display apparatus 2000 may include the directional backlight unit 100 and a display panel 301. The display panel 301 is different from the display panel 300 of FIG. 1 with respect to a location of the absorptive wire grid polarizer 330.

The absorptive wire grid polarizer 330 may be disposed in a lower surface of the first substrate 310. The absorptive wire grid polarizer 330 may include the plurality of metal wires 335 that may be integrally disposed on the first substrate 310. Alternatively, the plurality of metal wires 335 may be formed by being supported on a transparent substrate (not shown) and then the transparent substrate may be adhered to the lower surface of the first substrate 310. The planarization layer 338 that provides a cover between the plurality of metal wires 335 and upper portions thereof may be further provided. The planarization layer 338 may be omitted.

Figure 10:
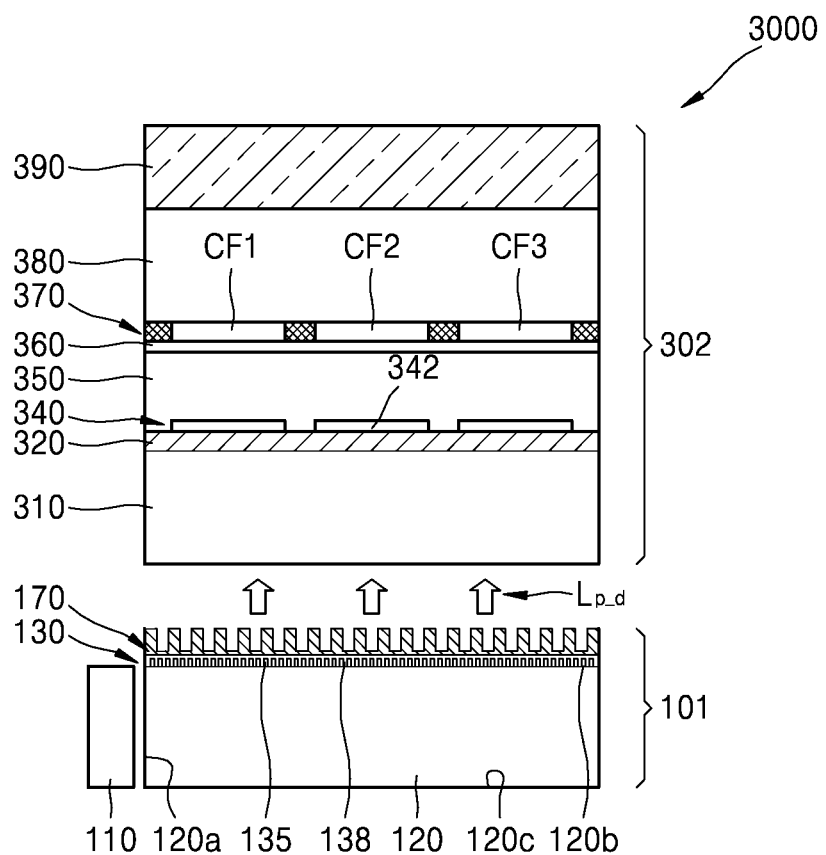
FIG. 10 is a cross-sectional view of a schematic structure of a 3D image display apparatus, according to another exemplary embodiment.

FIG. 10 is a cross-sectional view of a schematic structure of a 3D image display apparatus 3000, according to another exemplary embodiment.

The 3D image display apparatus 3000 may include a directional backlight unit 101 that provides a directional light and a display panel 302 that modulates a light that is received from the directional backlight unit 100 according to image information.

The directional backlight unit 101 may provide a polarized directional light $L_{p\_d}$ to the display panel 302. The directional backlight unit 101 may include the light source 110, the light guide plate 120 which guides the light emitted from the light source 110 and emits the light to an emission surface, an absorptive wire grid polarizer 130 disposed on the light guide plate 120, and the diffraction device 170 provided on the absorptive wire grid polarizer 130.

The absorptive wire grid polarizer 130 may include a plurality of metal wires 135, each of which includes an absorptive metal material. A planarization layer 138 that provides a covering between the plurality of metal wires 135 and upper portions thereof may be further provided. The planarization layer 138 may include a material that has the same refractivity as the refractivity of the light guide plate 120, and may include the same material as the light guide plate 120. The planarization layer 138 may include a material that has the same refractivity as the refractivity of the diffraction device 170, and may include the same material as the diffraction device 170. The planarization layer 138 may be provided to support the diffraction device 170 and may be omitted if necessary.

The plurality of metal wires 135 may be integrally formed on the emission surface 120b of the light guide plate 120.

Alternatively, the absorptive wire grid polarizer 130 may further include a transparent substrate (not shown). The plurality of metal wires 135 may be arranged on the transparent substrate and then the transparent substrate may be adhered onto the emission surface 120b of the light guide plate 120. In this case, the transparent substrate may include a material that has the same refractivity as the refractivity of the light guide plate, or may include the same material as the light guide plate 120.

The light from the light source 110 may be totally reflected from the reflection surface 120c, may propagate through the light guide plate 120, and may be irradiated to the absorptive wire grid polarizer 130 disposed on the emission surface 120b of the light guide plate 120. Among the light irradiated to the absorptive wire grid polarizer 130, only a light of polarization that may propagate through the absorptive wire grid polarizer 130, i.e. a light of a first polarization which is perpendicular to a length direction of the metal wires 135, may propagate through the absorptive wire grid polarizer 130 and may be emitted to the diffraction device 170. Then, the light may be emitted as the directional light $L_{p\_d}$ by an action of the diffraction device 170.

The display panel 302 employed in the 3D image display apparatus 3000 of the present exemplary embodiment may include only one polarization plate 390, unlike a usual liquid crystal display. The polarization plate 390 may be provided to an upper surface of the second substrate 380, i.e. a display surface from which a light modulated by the liquid crystal layer 350 is emitted, while no polarization plate is provided to the lower surface of the first substrate 310, i.e. a surface to which the light is emitted from the directional backlight unit 101. Although no polarization plate is provided in this location, the light $L_{p\_d}$ polarized in one direction by the directional backlight unit 101 may be provided to the liquid crystal layer 350.

Therefore, a distance between the diffraction device 170 and a pixel of the display panel 302 may be reduced by as much as a thickness of a PVA polarization plate that is usually provided in a lower portion of a conventional liquid crystal panel, and thus a 3D image with a good quality in which a cross-talk is reduced may be formed.

Figure 11:
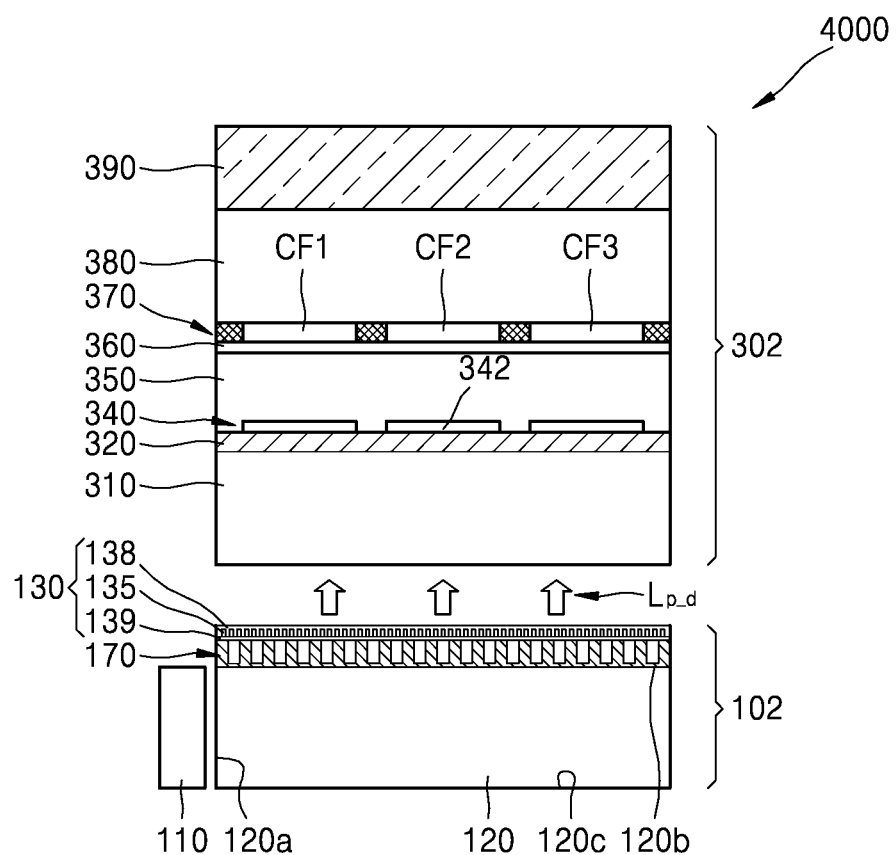
FIG. 11 is a cross-sectional view of a schematic structure of a 3D image display apparatus, according to another exemplary embodiment.

FIG. 11 is a cross-sectional view of a schematic structure of a 3D image display apparatus 4000, according to another exemplary embodiment.

The 3D image display apparatus 4000 may include a directional backlight unit 102 and the display panel 302.

The 3D image display apparatus 4000 of the present exemplary embodiment is different from the 3D image display apparatus 3000 of FIG. 10 only with respect to a location of the absorptive wire grid polarizer 130 included in the directional backlight unit 102.

The absorptive wire grid polarizer 130 may be disposed on the diffraction device 170. For this arrangement, the absorptive wire grid polarizer 130 may further include a transparent substrate 139 that supports the plurality of metal wires 135, in addition to the plurality of metal wires 135. The transparent substrate 139 may be adhered onto the diffraction device 170. The absorptive wire grid polarizer 130 may further include the planarization layer 138 which provides a covering between the plurality of metal wires 135 and upper portions thereof. The planarization layer 138 may be omitted.

A directional light formed by the diffraction device 170 may enter the absorptive wire grid polarizer 130, and only a light of a first polarization that is perpendicular to a length direction of the metal wires 135 may propagate through the absorptive wire grid polarizer 130. Through this light path, polarized directional light $L_{p\_d}$ may be provided by the directional backlight unit 102.

The polarized directional light $L_{p\_d}$ may be provided to the display panel 302 by the directional backlight unit 102, and thus the polarization plate 390 may be provided only in an upper portion of the display panel 302, while no polarization plate may be provided in a lower portion thereof. Thus, a distance from the diffraction device 170 to a pixel of the display panel 302 may be reduced by as much as a thickness difference of a typical PVA polarization plate and the absorptive wire grid polarizer 130, and a 3D image with a good quality in which a cross-talk is reduced may be formed.

The 3D image display apparatus described above may employ an absorptive wire grid polarizer, thereby minimizing a distance from a diffraction device included in a directional backlight unit to a display pixel.

The 3D image display apparatus described above may reduce a cross-talk when forming a 3D image by using a directional light, thereby providing the 3D image with a high quality.

A directional backlight unit and a 3D image display apparatus that includes the same are described above with respect to exemplary embodiments, examples of which are illustrated in the accompanying drawings. It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

What is claimed is:

1. A directional backlight unit comprising:
   a light source configured to emit light;
   a light guide plate comprising an incident surface upon which the light emitted from the light source is incident, an emission surface from which the light that has propagated through the incident surface is emitted, and a reflection surface facing the emission surface;
   an absorptive wire grid polarizer disposed on the emission surface, the absorptive wire grid polarizer comprising a plurality of metal wires, each of the plurality of metal wires comprising an absorptive metal material, each of the plurality of metal wires having a length in a first direction, and each of the plurality of metal wires being arranged in a second direction that is perpendicular to the first direction; and a diffraction device configured to diffract the light emitted from the light guide plate toward a plurality of different viewing zones, wherein the diffraction device comprises a plurality of diffraction device components that are arranged in a repeating pattern, wherein each of the plurality of diffraction device components comprises a grating device configured to adjust a direction in which the light is emitted from the diffraction device, and wherein the grating device comprises a plurality of sub grating devices comprising gratings in which at least one from among an arrangement direction and an arrangement cycle is different, a number of the plurality of sub grating devices being the same as a number of the plurality of different viewing zones.

2. The directional backlight unit of claim 1, wherein the absorptive wire grid polarizer is disposed between the diffraction device and the light guide plate.

3. The directional backlight unit of claim 2, wherein each of the plurality of metal wires is integrally formed on the emission surface of the light guide plate.

4. The directional backlight unit of claim 3, further comprising:
a planarization layer configured to cover areas between the plurality of metal wires and to cover upper portions of the plurality of metal wires.

5. The directional backlight unit of claim 4, wherein the planarization layer includes a material that has a refractivity that is the same as a refractivity of the light guide plate.

6. The directional backlight unit of claim 1, wherein the diffraction device is interposed between the absorptive wire grid polarizer and the light guide plate.

7. The directional backlight unit of claim 6, wherein the absorptive wire grid polarizer further comprises a transparent substrate configured to support the plurality of metal wires, and
wherein the transparent substrate is adhered onto the diffraction device.

8. The directional backlight unit of claim 1, wherein each of the plurality of metal wires comprises at least one from among Cr, Mo, FeSi2, CuO, and Fe3O4.

9. A three-dimensional (3D) image display apparatus comprising:
the directional backlight unit of claim 1; and
a display panel configured to modulate a light received from the directional backlight unit according to image information.

10. The 3D image display apparatus of claim 9, wherein the display panel includes a liquid crystal panel.

11. The 3D image display apparatus of claim 10, wherein the liquid crystal panel comprises a single polarization plate disposed in a display surface of the liquid crystal panel.

12. A three-dimensional (3D) image display apparatus comprising:
a light source configured to emit light for forming an image;
a light guide plate comprising an incident surface upon which the light emitted from the light source is incident, an emission surface from which the light that has propagated through the incident surface is emitted, and a reflection surface facing the emission surface;

a diffraction device configured to diffract the light emitted from the light guide plate toward a plurality of different viewing zones;

an absorptive wire grid polarizer comprising a plurality of wires, all of the plurality of wires included in the absorptive wire grid polarizer being entirely formed of an absorptive metal material, each of the plurality of wires having a length in a first direction, each of the plurality of wires being arranged in a second direction that is perpendicular to the first direction, and the absorptive wire grid polarizer transmitting light polarized in the second direction and absorbing light polarized in the first direction with respect to the light diffracted from the diffraction device;

a liquid crystal layer in which a polarization of light that propagates through the absorptive wire grid polarizer is controlled according to image information; and a polarization plate spaced apart from the absorptive wire grid polarizer such that the liquid crystal layer is disposed therebetween and having a polarization axis in the first direction or the second direction, wherein the diffraction device comprises a plurality of diffraction device components that are arranged in a repeating pattern, wherein each of the plurality of diffraction device components comprises a grating device configured to adjust a direction in which the light is emitted from the diffraction device, and wherein the grating device comprises a plurality of sub grating devices comprising gratings in which at least one from among an arrangement direction and an arrangement cycle is different, a number of the plurality of sub grating devices being the same as a number of the plurality of different viewing zones.

13. The 3D image display apparatus of claim 12, further comprising:
a transparent substrate configured to support the absorptive wire grid polarizer and comprising a first surface facing the liquid crystal layer and a second surface facing the light guide plate.

14. The 3D image display apparatus of claim 13, wherein the absorptive wire grid polarizer is disposed on the first surface.

15. The 3D image display apparatus of claim 14, wherein each of the plurality of wires is integrally formed on the first surface of the transparent substrate.

16. The 3D image display apparatus of claim 15, wherein the absorptive wire grid polarizer further comprises a planarization layer configured to cover areas between the plurality of wires and to cover upper portions of the plurality of wires.

17. The 3D image display apparatus of claim 13, wherein the absorptive wire grid polarizer is disposed on the second surface.

18. The 3D image display apparatus of claim 17, wherein each of the plurality of wires is integrally formed on the second surface of the transparent substrate.

19. The 3D image display apparatus of claim 13, wherein each of the plurality of wires comprises at least one from among Cr, Mo, FeSi2, CuO, and Fe3O4 .

20. The 3D image display apparatus of claim 12, wherein the absorptive wire grid polarizer is disposed between the diffraction device and the light guide plate.

21. The 3D image display apparatus of claim 12, wherein each of the plurality of wires is integrally formed on the emission surface of the light guide plate.

22. The 3D image display apparatus of claim 12, wherein the diffraction device is interposed between the absorptive wire grid polarizer and the light guide plate.

* * * * *